United States Patent [19]
Shim et al.

[11] Patent Number: 5,994,447
[45] Date of Patent: Nov. 30, 1999

[54] ORGANIC-INORGANIC COMPLEX COMPOSITION FOR COATING METAL SURFACE

[75] Inventors: Jeung-Yeop Shim, Kyeongki-Do; Houng-Ook Kim, Seoul; Ki-Myong Song, Kyeongki-Do, all of Rep. of Korea

[73] Assignee: Daihan Paint & Ink Co., Ltd., Rep. of Korea

[21] Appl. No.: 08/885,476

[22] Filed: Jun. 30, 1997

[30] Foreign Application Priority Data

Dec. 10, 1996 [KR] Rep. of Korea .................. 96-63879

[51] Int. Cl.$^6$ ...................................... C08K 3/00
[52] U.S. Cl. ................. 524/492; 524/493; 106/14.44
[58] Field of Search .................... 524/492, 493; 106/14.44

[56] References Cited

U.S. PATENT DOCUMENTS

| | | | |
|---|---|---|---|
| 4,358,551 | 11/1982 | Shimp | 523/414 |
| 5,213,846 | 5/1993 | Tsuneta et al. | 427/386 |
| 5,283,279 | 2/1994 | Hara et al. | 524/492 |

*Primary Examiner*—Edward J. Cain
*Attorney, Agent, or Firm*—Ostrolenk, Faber, Gerb & Soffen, LLP

[57] ABSTRACT

Disclosed is an aqueous organic-inorganic complex coating composition for a thin film which has a good curing characteristic at a low temperature and various good characteristics. The organic-inorganic complex coating composition for a steel sheet comprises about 100 weight parts of a water-soluble acrylic or vinyl modified organic high polymer resin, about 5 to 100 weight parts of a silica-based inorganic compound and about 1 to 50 weight parts of a curing agent based on the solid content of the water-soluble organic high polymer resin. The thin coating layer formed on the steel sheet using the organic-inorganic complex coating composition of the present invention has a good curing characteristic at a low temperature. Moreover, alkaline-resistance, corrosion-resistance, adhesiveness to the material, electrodeposition coating characteristic, anti-powdering characteristic, continuous weldability, and work efficiency of the coating are good. Moreover, since the coating composition of the present invention includes the acrylic or vinyl modified epoxy resin as a main component, an energy conservation problem and an environmental pollution problem can be solved. Further, working stability is good and the probability of a fire is decreased.

12 Claims, No Drawings

ORGANIC-INORGANIC COMPLEX COMPOSITION FOR COATING METAL SURFACE

BACKGROUND OF THE INVENTION

1. Field of the Invention

The present invention relates to an organic-inorganic (or organic-silicate) complex composition for coating a metal surface, and more particularly to an organic-inorganic complex composition for coating a metal surface that largely improves the surface protecting ability and the corrosion resistance of a steel sheet (or plate) treated by chrome or phosphoric acid and plated with an alloy of zinc-nickel, zinc-iron, zinc-aluminum, etc.

2. Description of the Prior Art

Research and development in improving the corrosion resistance in steel sheet by utilizing an alloy technique using metals such as zinc, nickel, chrome, manganese, aluminum, copper, cobalt, etc. have been continued. However, it is very difficult to obtain a sufficient corrosion resistance. Moreover, a stainless steel sheet having a good corrosion-resistance is very expensive, so the usage thereof is limited. In North America and Europe, since a lot of salts for defrosting and removing snow are used for preventing a frosting during winter, an anticorrosive steel sheet applied to the body of an automobile, becomes rigid. In order to solve this problem, a new method using an organic coating agent has been proposed. The conventional organic coating agent for the anticorrosive steel sheet is coated to a thickness of around 15 $\mu$m, and is called a thick film-type organic coating agent. However, the problems of powdering, low continuous weldability, sacrificial ability, etc. appear during a molding process.

Recently, a thin film-type complex coating agent which gives the film thickness of 1 to 2 $\mu$m, has been developed. This thin film-type complex coating agent has good corrosion-resistance, an improved continuous working characteristic, an anti-powdering characteristic, a good electrodeposition coating characteristic, etc. when compared with the above-mentioned thick film-type organic coating agent.

As an example of the thin film-type coating composition, disclosed in U.S. Pat. No. 5,213,846 (issued to Tsuneta et al.) is a corrosion-resistant coating composition. This composition comprises (i) a bisphenol type epoxy resin comprising bisphenol skeletons and epichlorohydrin skeletons and having at least two epoxy groups per molecule, and comprises (ii) silica particles. The bisphenol skeletons comprise bisphenol A skeletons and bisphenol F skeletons.

The coating method of the thin film-type complex coating agent includes the steps of coating a steel sheet plated with an alloy such as zinc-nickel, zinc-iron and zinc-aluminum, with 20 to 100 mg/m$^2$ of a surface treating agent consisting essentially of chrome or phosphoric acid, coating the complex coating agent to the thickness of 5 $\mu$m or less, and continuously coating, curing and drying at the material temperature of 100 to 250° C. This method is called a PCM coating method.

In the conventional thin film-type complex coating agent, epoxy resin, acryl resin, urethane resin, modified epoxy resin, modified acryl resin, etc. are used as a resin (binder). However, these components have the defects of weak adhesiveness to the material and not particularly good curing property, corrosion-resistance, continuous weldability, anti-powdering characteristic, alkaline-resistance and electrodeposition. Especially, at a high curing temperature of about 200° C. or over, an energy efficiency is not good and the properties of a steel sheet having high tension are deteriorated.

In addition, if the coating agent of the thin film-type is not sufficiently cured, the thus obtained coating layer may be exfoliated or a pre-treated chrome solution may liquate out during the removing process of an alkaline compound and a rinsing process carried out after the curing. Therefore, the corrosion-resistance of the steel sheet may be deteriorated or an important environmental problem may be induced.

Accordingly, the present inventors continue to improve the defects of the conventional thin film-type complex coating agent and develop a water-soluble thin film-type organic-inorganic complex coating composition which has a good curing ability at low temperature, alkaline-resistance, corrosion-resistance, a good adhesiveness to the material, a good electrodeposition coating characteristic, an anti-powdering characteristic, continuous weldability and a good work efficiency with respect to coating. This organic-inorganic complex coating composition uses acrylic or vinyl modified epoxy resin as a main component and is manufactured considering the environmental problem and the energy problem.

SUMMARY OF THE INVENTION

Accordingly, it is an object of the present invention to provide a water-soluble thin film-type organic-inorganic complex coating composition having a good curing ability at low temperature and various other good characteristics and being manufactured considering the environmental and energy problems.

To accomplish the above object, there is provided in the present invention an organic-inorganic complex coating composition for a steel sheet comprising about 100 weight parts of a water-soluble acrylic or a vinyl modified organic high polymer resin, about 5 to 100 weight parts of a silica-based inorganic compound, and about 1 to 50 weight parts of a curing agent based on a solid content of the water-soluble organic high polymer resin.

DETAILED DESCRIPTION OF THE INVENTION

Hereinafter, the present invention will be explained in more detail.

The organic-inorganic complex coating composition of the present invention mainly includes a water-soluble organic high polymer resin, a silica-based inorganic compound and a curing agent. Besides the main components, additional agents for controlling properties of the coating solution of the coating composition can be included.

The water-soluble organic high polymer resin uses an acrylic or vinyl modified epoxy resin as a main component. The high polymer resin is an energy-saving type, improves a working stability, and minimizes an environmental pollution and a probability of a fire.

The main components of the water-soluble organic high polymer resin are the epoxy resin and the acrylic or vinyl modified material. The molecular weight of the epoxy resin is preferably about 350 to 7,000 and the preferred epoxy equivalent of the epoxy resin is about 150 to 3,000. If the molecular weight of the epoxy resin is less than 350, foliation of the cured coating layer may occur, and if the molecular weight of the epoxy resin is larger than 7000, a modification reaction and the manufacturing of the water-soluble compound are difficult. For controlling the molecular weight and the epoxy equivalent of the epoxy resin, bisphenol can be added to a low molecular weight liquid epoxy resin for a reaction. As for the typical epoxy resin, bisphenol A-based epoxy resin, bisphenol F-based epoxy resin, novolac-based epoxy resin, etc. can be illustrated.

To improve the flexibility of the coating layer, to improve the adhesiveness to the coating material and to improve the work efficiency of the coating by lowering the glass transition temperature (Tg) of the epoxy resin, a dibasic acid of aliphatic compound, a one-functional fatty acid, and a one-functional chain stopper can be used.

The dibasic acid of aliphatic compound, the one-functional fatty acid and the one-functional chain stopper can be used alone or a mixture thereof can be used. The preferred amount of these components is about 5 to 200 weight parts based on about 100 weight parts of the epoxy resin. If the amount of these components is less than 5 weight parts based on about 100 weight parts of the epoxy resin, the possibility of gelation through a rapid reaction may appear, and if the amount of these components is larger than 200 weight parts, the molecular weight of the epoxy resin becomes unpreferably too small. As for the typical dibasic acid of aliphatic compound, adipic acid, azelaic acid, dimeric acid which is a synthetic compound of toluoyl fatty acid, etc. can be illustrated. As for the one-functional fatty acid, coconut oil fatty acid, cottenseed oil fatty acid, dehydrated castor oil fatty acid, linseed oil fatty acid, soybean oil fatty acid, toluoyl fatty acid, pelargonic acid, oleic acid, linoleic acid, etc. can be illustrated.

As for the one-functional chain stopper, benzoic acid, p-tertiary benzoic acid, etc. can be illustrated. The modification of the acrylic or vinyl compound (monomer) to the epoxy resin is carried out by using a graft synthetic method to the epoxy resin in the presence of a reaction catalyst or by using a synthetic method using an unsaturated acid such as maleic acid or fumaric acid. The preferred amount of the acrylic or vinyl monomer is about 10 to 100 weight parts based on about 100 weight parts of the epoxy resin. If the amount is less than 10 weight parts, the modification effect cannot be sufficiently obtained, and if the amount is larger than 100 weight parts, the anti-powdering characteristic and corrosion-resistance are rapidly lowered.

As for the typical acrylic or vinyl monomers which can be used in the present invention, the following can be used. Non-functional monomers such as methyl acrylate, ethyl acrylate, isopropyl acrylate, N-butyl acrylate, ethylhexyl acrylate, methyl methacrylate, ethyl methacrylate, butyl methacrylate, hexyl methacrylate, lauryl methacrylate, etc. can be illustrated. Carboxyl monomers such as acrylic acid, methacrylic acid, maleic acid, itaconic acid, crotonic acid, etc. can be illustrated. Hydroxy monomers such as 2-hydroxy methacrylate, hydroxypropyl acrylate, 2-hydroxyethyl acrylate, acryl amides, N-methylol acryl amide, glycidyl methacrylate, styrene, vinyl toluene, acrylonitrile, vinyl acetate, etc. can be illustrated. As for the reaction catalyst, widely known peroxide catalysts are preferably used.

In order to dissolve the acrylic or vinyl modified epoxy resin in water, a technical method of making a part of the polymer hydrophilic by using a neutralizing agent which ionizes the resin and charges the resin with electricity, can be used. The ionized resin is classified into an anionic resin, a cationic resin and a non-ionic resin. Since the solution used for the cationic resin is acidic, the container or the equipment of the resin might be easily corroded, so the use of the cationic resin is limited. In case of using the anionic resin, since the used solution is alkaline, the container or the equipment of the resin should not be corroded, so the anionic resin is widely used. As for the typical hydrophilic function of the anionic resin, carboxyl function is used.

As for the method of introducing the carboxyl-based hydrophilic function into the acrylic or vinyl modified epoxy resin, the co-polymerization reaction of an acrylic or vinyl modifier with materials having an unsaturated function such as maleic acid, fumaric acid, crotonic acid, acrylic acid and methacrylic acid can be used in the presence of a catalyst. The preferred acid value of the resin is about 20 to 200 mgKOH/g. If the acid value is less than 20 mgKOH/g, the resin is hardly made be water-soluble, and if the acid value is larger than 200 mgKOH/g, the corrosion-resistance and the water-resistance are rapidly lowered. In order to neutralize the carboxyl function and to make a water-soluble resin, an amine-based neutralizer or an alkali metal neutralizer is preferably used.

As for the silica-based inorganic complex used in the organic-inorganic complex composition for coating the metal surface of the present invention, dry silica, colloidal silica, etc. can be illustrated. A metal alloy steel sheet including the silica exhibits good corrosion-resistance under the repeated drying and wetting condition.

When using the dry silica, the surface roughness of the coating layer is coarse and the gloss of the surface is markedly lowered to give an inferior external appearance of the surface. Accordingly, the colloidal silica is preferred. The particle size of the colloidal silica is about 5 to 200 nm, and an acid solution whose pH is about 2 to 4 or an alkaline solution whose pH is about 8 to 10.5 can be used. The preferred amount of the colloidal silica is about 5 to 100 weight parts in a solid content based on about 100 weight parts of the water-soluble organic high polymer resin. If the amount is less than 5 weight parts, the corrosion-resistance is lowered, and if the amount is larger than 100 weight parts, the viscosity of the solution during storage is rapidly increased so that the work efficiency is lowered.

The curing agent of the organic-inorganic complex composition for coating the metal surface is an important factor in primarily determining the curing characteristic of the coating composition, which is concerned with the properties of the work efficiency of the electrodeposition, alkaline-resistance, and the prevention of the eruption of the chromic surface treating agent to water.

As for the curing agent, an amino resin such as a melamine-formaldehyde resin, a urea-formaldehyde resin, a benzoguanimine-formaldehyde resin and an isocyanate resin such as a blocked isocyanate can be preferably used for the storage stability of the solution. As for the blocking agent, an alcoholic or oxime-based blocking agent which can be possibly dissociated at low temperature, can be effectively used. The amount of the amino curing agent or the blocked isocyanate curing agent is preferably about 1 to 50 weight parts in the solid content based on about 100 weight parts of the water-soluble organic high polymer resin. If the amount of the curing agent is less than 1 weight parts, the curing characteristic is poor and the alkaline-resistance and a solvent-resistance are not good. If the amount of the curing agent is larger than 50 weight parts, a brittleness is generated, and the adhesiveness to the material and the anti-powdering characteristics are poor.

As for the additional agent of the organic-inorganic complex coating composition, a bubble-preventing agent for controlling the generation of the bubble of the solution, a surface tension controller for the work efficiency, a rust and corrosion preventing agent, an isocyanate blocking agent, a catalyst for dissociation and curing, etc. can be used.

Hereinafter, the present invention will be described in detail referring to the preferred embodiments. However, the present invention is not limited to the following embodiments but various modifications and applications within the spirit and the scope of the present invention based on the description and the claims can be possible, and these modifications and applications are also included in the scope of the present invention.

SYNTHETIC EXAMPLE 1

About 153.3 weight parts of a bisphenol-based resin whose epoxy equivalent is about 750 to 2100, about 53.1 weight parts of dimeric acid (dimer about 87% and trimer about 13%) and about 35.1 weight parts of soybean oil fatty acid were added to a four-necked flask to which a stirrer, a thermometer, a condenser provided with a decanter and a heater were installed. The temperature was slowly increased to about 230 to 250° C. and the mixture was reacted until the acid value of the mixture became 5. The reaction mixture was diluted using about 75 weight parts of butyl cellosolve at below 150° C.

To the obtained product, about 17.2 weight parts of methacrylic acid, about 24.1 weight parts of 2-hydroxyethyl methacrylate, about 35.2 weight parts of butyl methacrylate, about 21.2 weight parts of styrene and about 43 weight parts of cumene hydroperoxide as an initiator were dropped at 130° C. for 3 hours and were reacted until the residual monomer became about 0.5% or less. Next, the resulting product was cooled to below 70° C. and neutralized by adding about 20.3 weight parts of dimethyl ethanolamine, and about 1,100 weight parts of water was added to obtain a transparent and white liquid whose solid content was about 22%, pH was about 8.5 and viscosity was about 14 seconds (FORDCUP No.4, 20° C.).

SYNTHETIC EXAMPLE 2

About 200 weight parts of a bisphenol-based epoxy resin (molecular weight of 1400) and about 168 weight parts of dimeric acid were added to a 2L four-necked flask which was provided with a stirrer, a heater, a thermometer and a condenser. The temperature was raised to about 210° C. and the mixture was reacted until the acid value of the mixture became about 30 to 35. The resulting product was cooled to about 100° C. Then, about 9.9 weight parts of anhydrous maleic acid was added and reacted at about 100° C. for about 30 to 60 minutes. The final acid value was about 40 to 45. Next, about 30 weight parts of triethylamine was added to the resulting product at below 70° C. and the mixture was stirred for about 10 minutes. About 1480 weight parts of water was added and stirred at the velocity of about 300 rpm. A white and transparent aqueous liquid of which solid content was about 20% and pH was about 8.5, was obtained.

EXAMPLE 1

About 100 weight parts of the white liquid prepared by synthetic example 1, about 42.8 weight parts of silica sol (Snowtex C, solid content 20%, manufactured by Nissan Chemical Industries Ltd., in Japan), about 7.9 weight parts of Simel 303 (tradename, manufactured by American Cyanamid Co.,), about 0.2 weight parts of Byk 023 (tradename, manufactured by Byk- Gulden lomberg Chem.Fabrik,GmbH., in Germany) as a defoamer, about 0.5 weight parts of about 6% cobalt octate solution and about 72 weight parts of water were mixed to obtain an organic-inorganic complex coating composition whose solid content was about 15 to 16% and pH was about 8.5 to 9.

EXAMPLE 2

About 100 weight parts of the white liquid prepared by synthetic example 1, about 42.8 weight parts of silica sol (Snowtex C, solid content 20%, manufactured by Nissan Chemical Industries Ltd., in Japan), about 17.8 weight parts of blocked isocyanate whose solid content was about 40%, about 0.2 weight parts of Byk (tradename, manufactured by Byk-Gulden lomberg Chem.Fabrik,GmbH., in Germany) as a defoamer, about 2.0 weight parts of tin compound of about 20% water dispersion, about 1.0 weight parts of about 1% aqueous salt solution of acetic acid and about 62.5 weight parts of water were mixed to obtain an organic-inorganic complex coating composition whose solid content was about 15 to 16% and pH was about 8.5 to 9.

EXAMPLE 3

About 100 weight parts of the white liquid prepared by synthetic example 1, about 42.8 weight parts of silica sol (Snowtex 0, solid content 20%, manufactured by Nissan Chemical Industries Ltd., in Japan), about 17.8 weight parts of blocked isocyanate whose solid content was 40%, about 0.2 weight parts of Byk (tradename, manufactured by Byk-Gulden lomberg Chem.Fabrik,GmbH., in Germany) as a defoamer, about 2.0 weight parts of tin compound of about 20% water dispersion, about 1.0 weight parts of about 1% aqueous salt solution of acetic acid and about 62.5 weight parts of water were mixed to obtain an organic-inorganic complex coating composition whose solid content was about 15 to 16% and pH was about 7.5 to 8.

Comparative Example 1

About 100 weight parts of the white liquid prepared by synthetic example 2, about 42.8 weight parts of silica sol (Snowtex C, solid content 20%, manufactured by Nissan Chemical Industries Ltd., in Japan), about 17.8 weight parts of blocked isocyanate of which solid content was about 40%, about 0.2 weight parts of Byk (tradename, manufactured by Byk-Gulden lomberg Chem.Fabrik,GmbH., in Germany) as a defoamer, about 2.0 weight parts of tin compound of about 20% water dispersion, about 1.0 weight parts of about 1% aqueous salt solution of acetic acid and about 62.5 weight parts of water were mixed to obtain an organic-inorganic complex coating composition whose solid content was about 15 to 16% and pH was about 8.5 to 9.

Comparative Example 2

About 100 weight parts of the white liquid prepared by synthetic example 2, about 42.8 weight parts of silica sol (Snowtex C, solid content 20%, manufactured by Nissan Chemical Industries Ltd., in Japan), about 7.9 weight parts of Simel 303 (tradename, manufactured by American Cyanamid Co.,), about 0.2 weight parts of Byk (tradename, manufactured by Byk-Gulden lomberg Chem.Fabrik, GmbH. in Germany) as a defoamer, about 0.5 weight parts of about 6% solution of cobalt octate and about 72 weight parts of water were mixed to obtain an organic-inorganic complex coating composition whose solid content was about 15 to 16% and pH was about 8.5 to 9.

Manufacture of a Test Sample

On a steel sheet which was treated with about 50 mg/m$^2$ of chrome and plated with about 20 to 30 mg/m$^2$ of zinc-nickel, the coating compositions obtained by examples 1–3 and comparative examples 1–2 were coated using a bar coater No. 3 so that the thicknesses of the dried coating layers was about 1 μm. And then, each coating layer was dried in a hot air circulating oven so that the surface temperature of the material became about 180° C.

Sample Test

Test of the External Appearance

The external appearance of the coated test sample was examined with naked eyes to see if the surface contains any foreign materials, color stains or a non-coated area.

Test of the Electrodeposition Coating Characteristic (cationic electrodeposition)

The electrodeposition coating was carried out at a low voltage (about 30 to 50 V) and at a high voltage (about 200 to 230 V). The external appearance, pin holes, linearity, gloss and roughness of the surface were examined.

Test of the Alkaline-resistance (5% NaOH for 5 minutes)

Spot test was carried out using about 5% aqueous NaOH solution for about 5 minutes. The surface was examined with naked eyes for determining the presence of a surface defect.

Test of the Solvent-resistance (MEK reciprocating rubbing)

After dipping a gauze in methyl ethyl ketone (MEK), the coating layer was reciprocatingly rubbed by the gauze and the surface state of the coating layer was observed.

Test of the Corrosion-resistance

1. A flat plate and a cupping were exposed to a salt spray test (SST) and a cyclic corrosion test (CCT) under the condition of the following: exposing to about 5% saline solution at about 36° C. for about 4 hours, drying at about 60° C. for about 2 hours, and standing at about 95% RH and at about 50° C. for about 2 hours.

2. After electrodeposition coating, primer coating and top coating, the flat plate and the cupping were cut in X shapes. Under CCT, the progress of the width of blister was observed.

Test of the Continuous Weldability (5000 times)

Appropriate current range and continuous dotting number were examined.

Test of the Elution of Chrome

The test sample was immersed in water for about 24 hours and the amount of chrome elution was confirmed by means of an inorganic analyzer (ICP).

Test of the Powdering Characteristic

After extending by about 2% and exfoliating using a sandpaper, the powdering characteristic was examined.

The testing results of the test sample are illustrated in Table 1.

TABLE 1

| | Exam. 1 | Exam. 2 | Exam. 3 | com. exam. 1 | Com. Exam. 2 |
|---|---|---|---|---|---|
| external appearance | ⊙ | ⊙ | ⊙ | o | o |
| electrodeposition coating | Δ | ⊙ | ⊙ | ⊙ | Δ |
| alkaline-resistance | Δ | ⊙ | ⊙ | ⊙ | Δ |
| solvent-resistance | o | o | o | o | x |
| corrosion-resistance | o | ⊙ | ⊙ | x | x |
| continuous weldability | o | ⊙ | ⊙ | Δ | Δ |
| chrome elution | o | ⊙ | ⊙ | ⊙ | Δ |
| powdering characteristic | o | o | o | o | o |

Notes; ⊙; excellent, o: good, Δ; fair and x; poor
Exam.; example, Com. Exam.; comparative example As shown in Table 1, the thin coating layer formed on the steel sheet using the organic-inorganic complex coating composition employing the acrylic or vinyl modified aqueous organic high polymer resin according to the present invention, has a good curing characteristic at a low temperature, good alkaline-resistance, good corrosion-resistance, good adhesiveness to the material, good electrodeposition coating characteristic, good anti-powdering characteristic, good continuous weldability and good work efficiency of the coating. Moreover, since the coating composition of the present invention includes the acrylic or vinyl modified epoxy resin as the main component, an energy conservation problem and an environmental pollution problem can be solved. Further, the working stability is good and the probability of a fire is minimized.

Meanwhile, the solvent-resistance, the corrosion-resistance and the continuous weldability of the thin coating layer formed on the steel sheet using the conventional bisphenol-based epoxy resin, are not good. Further, the external appearance of the conventional coating layer is worse than the coating layer formed by using the coating composition of the present invention.

As described above, the thin coating layer formed on the steel sheet using the organic-inorganic complex coating composition using the acrylic or vinyl modified aqueous organic high polymer resin according to the present invention, has a good curing characteristic at low temperature. Moreover, the alkaline-resistance, the corrosion-resistance, the adhesiveness to the material, the electrodeposition coating characteristic, the anti-powdering characteristic, the continuous weldability and the work efficiency of the coating are good. Further, since the coating composition of the present invention includes the acrylic or vinyl modified epoxy resin as the main component, the energy conservation problem and the environmental pollution problem can be solved. Further, the working stability is good and the probability of a fire is decreased.

What is claimed is:

1. An organic-inorganic complex coating composition for a steel sheet comprising about 100 weight parts of a water-soluble acrylic or vinyl grafted epoxy resin having an epoxy function, about 5 to 100 weight parts of a silica-based inorganic compound and about 1 to 50 weight parts of a curing agent based on a solid content of said water-soluble epoxy resin.

2. An organic-inorganic complex coating composition for a steel sheet as claimed in claim 1, wherein said water-soluble organic high polymer resin is a bisphenol-based epoxy resin whose molecular weight is about 350 to 7,000 and an epoxy equivalent is about 150 to 3,000.

3. An organic-inorganic complex coating composition for a steel sheet as claimed in claim 2, further comprising about 5 to 200 weight parts of a dibasic acid of aliphatic compound, a one-functional fatty acid, a one-functional chain stopper, or a mixture thereof based on about 100 weight parts of said bisphenol-based epoxy resin to improve a flexibility of a coating layer, to improve an adhesiveness to a coating material and to improve a work efficiency of coating by lowering a glass transition temperature of said bisphenol-based epoxy resin.

4. An organic-inorganic complex coating composition for a steel sheet as claimed in claim 1, wherein said acrylic or vinyl modified epoxy resin is obtained by graft synthesizing an acrylic or vinyl-based monomer to an epoxy resin in the presence of a reaction catalyst or by a synthetic method using unsaturated acid, an amount of said acrylic or vinyl-monomer being about 10 to 100 weight parts based on about 100 weight parts of said epoxy resin.

5. An organic-inorganic complex coating composition for a steel sheet as claimed in claim 4, wherein said acrylic or vinyl-based monomer used for preparing said water-soluble acrylic or vinyl modified epoxy resin is at least one selected from the group consisting of non-functional monomers of methyl acrylate, ethyl acrylate, isopropyl acrylate, N-butyl acrylate, ethylhexyl acrylate, methyl methacrylate, ethyl methacrylate, butyl methacrylate, hexyl methacrylate, and lauryl methacrylate, of carboxyl monomers of acrylic acid, methacrylic acid, maleic acid, itaconic acid, and crotonic acid, and of hydroxy monomers of 2-hydroxy methacrylate, hydroxypropyl acrylate, 2-hydroxyethyl acrylate, acryl amide, N-methylol acrylamide, glycidyl methacrylate, styrene, vinyl toluene, acrylonitrile, and vinyl acetate.

6. An organic-inorganic complex coating composition for a steel sheet as claimed in claim 1, wherein said silica-based inorganic compound is a colloidal silica whose particle size is about 5 to 200 nm.

7. An organic-inorganic complex coating composition for a steel sheet as claimed in claim 1, wherein said curing agent is a blocked isocyanate or at least one amino resin selected from the group consisting of a melamine-formaldehyde resin, a urea-formaldehyde resin and a benzoguanamine-formaldehyde resin.

8. An organic-inorganic complex coating composition for a steel sheet, comprising:

about 100 weight parts of a water-soluble acrylic or vinyl grafted epoxy resin having an epoxy function, said acrylic or vinyl modified epoxy resin being obtained by graft synthesizing an acrylic or vinyl-based monomer to an epoxy resin in the presence of a reaction catalyst or by a synthetic method using unsaturated acid, an amount of said acrylic or vinyl-monomer being about 10 to 100 weight parts based on about 100 weight parts of said epoxy resin;

about 5 to 100 weight parts of a silica-based inorganic compound;

about 1 to 50 weight parts of a curing agent based on a solid content of said water-soluble epoxy resin, and about 5 to 200 weight parts of a dibasic acid of aliphatic compound, a one-functional fatty acid, a one-functional chain stopper, or a mixture thereof based on about 100 weight parts of said bisphenol-based epoxy resin, to improve a flexibility of a coating layer, to improve an adhesiveness to a coating material and to improve a work efficiency of coating by lowering a glass transition temperature of said bisphenol-based epoxy resin.

9. An organic-inorganic complex coating composition for a steel sheet as claimed in claim 8, wherein said water-soluble epoxy resin is a bisphenol-based epoxy resin whose molecular weight is about 350 to 7,000 and an epoxy equivalent is about 150 to 3,000.

10. An organic-inorganic complex coating composition for a steel sheet as claimed in claim 8, wherein said acrylic or vinyl-based monomer is at least one selected from the group consisting of non-functional monomers of methyl acrylate, ethyl acrylate, isopropyl acrylate, N-butyl acrylate, ethylhexyl acrylate, methyl methacrylate, ethyl methacrylate, butyl methacrylate, hexyl methacrylate and lauryl methacrylate, of carboxyl monomers of acrylic acid, methacrylic acid, maleic acid, itaconic acid, and crotonic acid, and of hydroxy monomers of 2-hydroxy methacrylate, hydroxypropyl acrylate, 2-hydroxyethyl acrylate, acryl amide, N-methylol acrylamide, glycidyl methacrylate, styrene, vinyl toluene, acrylonitrile, and vinyl acetate.

11. An organic-inorganic complex coating composition for a steel sheet as claimed in claim 8, wherein said silica-based inorganic compound is a colloidal silica whose particle size is about 5 to 200 nm.

12. An organic-inorganic complex coating composition for a steel sheet as claimed in claim 8, wherein said curing agent is a blocked isocyanate or at least one amino resin selected from the group consisting of a melamine-formaldehyde resin, a urea-formaldehyde resin and a benzoguanamine-formaldehyde resin.

* * * * *